United States Patent
Assmann et al.

(10) Patent No.: US 9,079,538 B2
(45) Date of Patent: Jul. 14, 2015

(54) PAIR OF EXTERNAL VEHICLE MIRRORS

(75) Inventors: Willibald Assmann, Ostfildern (DE);
Fabian Franke, Hochstadt (DE);
Michael Friederich, Gerlingen (DE);
Wolfgang Much, Ammerbuch (DE);
Volker Nickel, Voehringen (DE); Robert Schwed, Bad Teinach (DE)

(73) Assignee: Daimler AG, Stuttgart (DE)

( * ) Notice: Subject to any disclaimer, the term of this patent is extended or adjusted under 35 U.S.C. 154(b) by 291 days.

(21) Appl. No.: 13/636,462

(22) PCT Filed: Dec. 17, 2010

(86) PCT No.: PCT/EP2010/007762
§ 371 (c)(1),
(2), (4) Date: Nov. 2, 2012

(87) PCT Pub. No.: WO2011/116810
PCT Pub. Date: Sep. 29, 2011

(65) Prior Publication Data
US 2013/0057976 A1 Mar. 7, 2013

(30) Foreign Application Priority Data
Mar. 23, 2010 (DE) .......................... 10 2010 012 316

(51) Int. Cl.
*G02B 7/182* (2006.01)
*B60R 1/06* (2006.01)

(52) U.S. Cl.
CPC ....................................... *B60R 1/06* (2013.01)

(58) Field of Classification Search
CPC ........ B60R 1/074; B60R 1/076; B60R 1/078; B60R 1/06; B60R 1/0605

USPC ........................... 359/841, 872, 877; 248/479
See application file for complete search history.

(56) References Cited

U.S. PATENT DOCUMENTS

| | | | |
|---|---|---|---|
| 5,621,577 A * | 4/1997 | Lang et al. ..................... 359/872 |
| 8,201,305 B2 | 6/2012 | Brouwer et al. | |
| 2005/0122605 A1 | 6/2005 | Lang et al. | |
| 2006/0274443 A1 * | 12/2006 | Lang et al. ..................... 359/872 |

FOREIGN PATENT DOCUMENTS

| CN | 1618659 A | 5/2005 |
|---|---|---|
| CN | 201068127 Y | 6/2008 |

(Continued)

OTHER PUBLICATIONS

International Search Report with English translation dated Apr. 11, 2011 (four (4) pages).

(Continued)

*Primary Examiner* — Euncha Cherry
(74) *Attorney, Agent, or Firm* — Crowell & Moring LLP

(57) ABSTRACT

A pair of external vehicle mirrors with a driver-side external vehicle mirror and a passenger-side external vehicle mirror are provided. Each have a mirror foot and a mirror housing pivotably attached, in which an adjustable mirror glass is arranged. The mirror housings of the two external vehicle mirrors are constructed symmetrically, so that an identical oncoming wind flow situation is achieved, and that on a rear side of the two mirror housings there is arranged a mask encompassing the mirror glass, the mask of the driver-side external vehicle mirror being formed asymmetrically to the mask of the passenger-side external vehicle mirror.

2 Claims, 1 Drawing Sheet

(56) References Cited

FOREIGN PATENT DOCUMENTS

Figure 1:
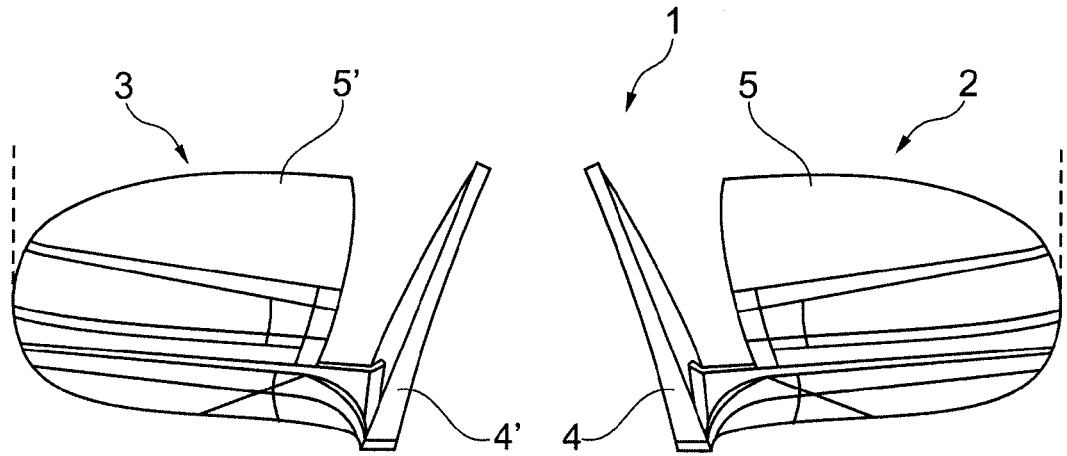

| | | |
|---|---|---|
| CN | 101535089 A | 9/2009 |
| DE | 85 33 057.4 U1 | 2/1986 |
| DE | 41 40 268 A1 | 6/1993 |
| EP | 0 223 923 A2 | 6/1987 |
| EP | 1 531 084 A2 | 5/2005 |
| EP | 1 531 084 A3 | 5/2005 |
| JP | 2004-299525 A | 10/2004 |
| JP | 2005-138831 A | 6/2005 |
| JP | 2007-137130 A | 6/2007 |

OTHER PUBLICATIONS

Form PCT/ISA/237 (six (6) pages).

Chinese Office Action dated May 5, 2014 (seven pages).

* cited by examiner

PAIR OF EXTERNAL VEHICLE MIRRORS

BACKGROUND AND SUMMARY OF THE INVENTION

The present invention relates to a pair of external vehicle mirrors with a driver-side and a passenger-side external vehicle mirror and to a motor vehicle with such a pair of external vehicle mirrors.

German Patent Document No. DE 85 33 057 U1 discloses a generic pair of external vehicle mirrors with a driver-side and a passenger-side external vehicle mirror. Each of these external vehicle mirrors therein has a mirror foot and a mirror housing attached pivotably thereto, in which an adjustable mirror glass is arranged. An adjustment device is provided between the mirror foot and the mirror housing, the adjustment device allows the setting of a mirror housing to two different pivoting positions, so that the external vehicle mirrors can be used both in a right-hand drive and in a left-hand drive vehicle. Although the symmetrical formation of the driver-side and passenger-side external vehicle mirror provides a symmetrical oncoming wind flow situation, which can hence be handled better, at the same time there is a restriction in the view, which can be problematic.

The present invention is therefore concerned with the problem of devising an improved, or at least an alternative, embodiment for a generic pair of external vehicle mirrors which is distinguished both by an improved view and by an improved oncoming wind flow situation.

In accordance with exemplary embodiments of the present invention a driver-side and a passenger-side external vehicle mirror are formed symmetrically, viewed from the front, and asymmetrically, viewed from on top. The symmetrical front view means that an oncoming wind flow situation is comparable on both vehicle mirrors and can therefore be readily controlled, while the asymmetrical formation of the two external vehicle mirrors, viewed from above, permits a better view. Each of the external vehicle mirrors in this case has a mirror foot and a mirror housing arranged pivotably thereto, in which an adjustable mirror glass is arranged. The mirror housings of both external vehicle mirrors in this case, according to the invention, are formed symmetrically, so that they are identical and hence readily controllable oncoming wind flow situation is yielded, with in each case a mask encompassing the mirror glass being arranged on a rear side of the two mirror housings, which mask however differs for the two external vehicle mirrors, in particular is formed asymmetrically. The oncoming wind flow surface of the two external vehicle mirrors is thus symmetrical and hence comparable, which means that disruptive air-flow noise and also accumulations of dirt that have occurred hitherto with asymmetrically formed external vehicle mirrors can be reduced. Owing to the asymmetrically formed masks, on the other hand, the view of the driver in the passenger-side external vehicle mirror, and hence the driving safety, improves overall. The pair of external vehicle mirrors according to the invention thus combines the advantages known from the prior art of a completely symmetrical pair of external vehicle mirrors with regard to the oncoming wind flow and also the advantages of asymmetrical external vehicle mirrors known from the prior art with regard to the view. The pair of external vehicle mirrors furthermore offers the great advantage that it can be readily adapted to left-hand drive or right-hand drive vehicles by simply exchanging the masks.

In an advantageous development of the solution according to the invention, the driver-side mask has a constant thickness, whereas the passenger-side mask is formed conically. The conical configuration is shown in an increasing thickness of the mask leading away from the vehicle and a thereby enlarged field of vision of the driver in the passenger-side external vehicle mirror. The masks that are asymmetrically formed according to the invention are furthermore optically unobtrusive, so that the overall visual impression of a symmetrical vehicle which has both considerably improved oncoming wind flow behavior and a considerably improved view can be obtained.

Further important features and advantages of the invention will become apparent from the dependent claims, the drawings and the associated description of the figures with reference to the drawings.

It goes without saying that the above-mentioned features and those still to be explained below can be used not only in the combination specified in each case, but also in different combinations or on their own, without departing from the scope of the present invention.

BRIEF DESCRIPTION OF THE DRAWING FIGURES

Preferred examples of embodiment of the invention are illustrated in the drawings and will be explained in greater detail in the following description, with identical reference numerals relating to identical or similar or functionally identical components.

Figure 2:
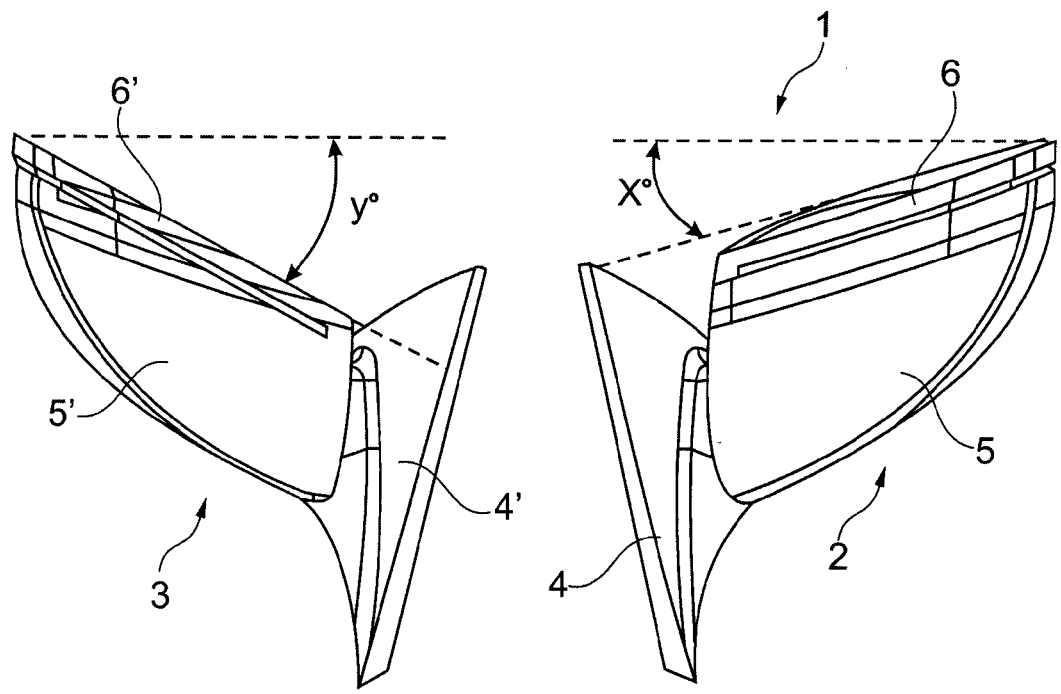

Therein, in each case diagrammatically:

FIG. 1 is a front view of a pair of external vehicle mirrors according to the invention, and FIG. 2 is a top view of the pair of external vehicle mirrors according to the invention.

DETAILED DESCRIPTION

Corresponding to FIGS. 1 and 2, a pair of external vehicle mirrors 1 according to the invention includes a driver-side external vehicle mirror 2 and a passenger-side external vehicle mirror 3. Each of the external vehicle mirrors 2, 3 mentioned has a mirror foot 4, 4' and a mirror housing 5, 5' arranged pivotably thereto, in which an adjustable mirror glass (not shown) is arranged. According to the invention, now the two mirror housings 5, 5' of the two external vehicle mirrors 2, 2 are constructed symmetrically, as can be seen in particular from FIG. 1, so that they yield an identical and hence readily controllable oncoming wind flow situation. On a rear side of the two mirror housings 5, 5' there is arranged in each case a mask 6, 6' encompassing the mirror glass, the mask 6 of the driver-side external vehicle mirror 2 being formed asymmetrically to the mask 6' of the passenger-side external vehicle mirror 3 (cf. FIG. 2). The asymmetrical configuration of the two masks 6, 6' enables a driver of a motor vehicle equipped with the pair of external vehicle mirrors 1 according to the invention to have an improved view in the passenger-side external vehicle mirror 3 and hence improved grasping of the surroundings of the motor vehicle, which increases driving safety.

As illustrated in FIG. 2, the driver-side mask 6 has a substantially constant thickness, whereas the passenger-side mask 6' is formed conically. This yields different angles X and Y, the angle Y being greater than the angle X. This yields an improved view in the passenger-side external vehicle mirror 3 for the driver of the motor vehicle compared with a variant in which symmetrical masks are used and hence the angle Y is the same size as the angle X.

The pair of external vehicle mirrors 1 according to the invention can furthermore be easily adapted to a left-hand drive or right-hand drive motor vehicle by arranging corresponding masks 6, 6' on the respective external vehicle mirror 2, 3. In the case of a right-hand drive motor vehicle, the mask 6' in the mirrored version would have to be placed on the mirror housing 5 of the external vehicle mirror 2 designated as the driver-side one in FIG. 2. With the pair of external vehicle mirrors 1 according to the invention, an identical approach flow and hence considerably reduced matching expense can be achieved in a wind tunnel due to the symmetrical mirror housing 5, 5'. The symmetrically formed mirror housings 5, 5' also reduce a level of noise which would occur in particular with asymmetrically formed mirror housings. At the same time, the asymmetrically formed masks 6, 6' permit lesser sight obstruction or self-obstruction, in particular housing parts, the two masks 6, 6' having a different oblique cut.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

The invention claimed is:

1. A pair of external vehicle mirrors, comprising:
a driver-side external vehicle mirror; and
a passenger-side external vehicle mirror,
wherein the driver- and passenger-side mirrors each have a mirror foot and a mirror housing pivotably attached pivotably to the mirror foot,
wherein an adjustable mirror glass is arranged in each of the mirror housings,
wherein each of the mirror housings of the two external vehicle mirrors are constructed symmetrically, so that an identical oncoming wind flow situation is achieved,
wherein a mask encompassing the mirror glass is arranged on a rear side of each of the mirror housings, and
wherein the mask of the driver-side external vehicle mirror is asymmetrically formed with respect to the mask of the passenger-side external vehicle mirror,
wherein the driver-side mask has a constant thickness and the passenger-side mask is formed conically.

2. A motor vehicle, comprising:
a driver-side external vehicle mirror; and
a passenger-side external vehicle mirror,
wherein the driver- and passenger-side mirrors each have a mirror foot and a mirror housing pivotably attached pivotably to the mirror foot,
wherein an adjustable mirror glass is arranged in each of the mirror housings,
wherein each of the mirror housings of the two external vehicle mirrors are constructed symmetrically, so that an identical oncoming wind flow situation is achieved,
wherein a mask encompassing the mirror glass is arranged on a rear side of each of the mirror housings, and
wherein the mask of the driver-side external vehicle mirror is asymmetrically formed with respect to the mask of the passenger-side external vehicle mirror,
wherein the driver-side mask has a constant thickness and the passenger-side mask is formed conically.

* * * * *